(12) United States Patent
Kim (10) Patent No.: US 8,120,711 B2
(45) Date of Patent: Feb. 21, 2012

(54) DISPLAY SYSTEM AND METHOD OF CONTROLLING A DISPLAY SYSTEM

(75) Inventor: Su Young Kim, Cheongjoo-si (KR)

(73) Assignee: LG Electronics Inc., Seoul (KR)

( * ) Notice: Subject to any disclaimer, the term of this patent is extended or adjusted under 35 U.S.C. 154(b) by 1548 days.

(21) Appl. No.: 11/526,828

(22) Filed: Sep. 26, 2006

(65) Prior Publication Data

US 2007/0199029 A1  Aug. 23, 2007

(30) Foreign Application Priority Data

Feb. 17, 2006 (KR) ........................ 10-2006-0015882

(51) Int. Cl.
*H04N 5/63* (2006.01)
*H04N 5/44* (2006.01)
*H04N 5/38* (2006.01)

(52) U.S. Cl. .................... 348/730; 348/725; 348/723

(58) Field of Classification Search .......... 348/723–726, 348/728, 553, 734, 730; 725/37, 48, 54, 725/59, 67, 68, 71, 81, 85, 118, 131, 139, 725/148, 151; *H04N 5/38, 5/40, 5/44, 5/455, H04N 7/16, 7/173, 7/18, 7/20, 5/63*
See application file for complete search history.

(56) References Cited

U.S. PATENT DOCUMENTS

| 5,081,534 | A | 1/1992 | Geiger et al. | 358/194.1 |
| 5,161,021 | A | 11/1992 | Tsai | 358/188 |
| 7,636,132 | B2 * | 12/2009 | Sakamoto | 348/723 |
| 2005/0138671 | A1 | 6/2005 | Love et al. | 725/123 |
| 2006/0008256 | A1 | 1/2006 | Khedouri et al. | 386/124 |
| 2006/0290814 | A1 * | 12/2006 | Walter | 348/554 |

FOREIGN PATENT DOCUMENTS

| CN | 1416272 | | 5/2003 |
| EP | 0 354 459 | | 8/1989 |
| JP | 2002223170 A | * | 8/2002 |
| WO | WO 99/34599 | | 7/1999 |
| WO | WO 00/41381 | | 7/2000 |

OTHER PUBLICATIONS

Partial European Search Report dated Apr. 1, 2010.
European Search Report for Application No. 06254666.8 dated Aug. 3, 2010.
Chinese Office Action dated Oct. 10, 2008.

* cited by examiner

*Primary Examiner* — Sherrie Hsia
(74) *Attorney, Agent, or Firm* — KED & Associates, LLP (57) ABSTRACT

A display system and a method of controlling a display system are provided. The display system may include a receiving device to transmit a power control signal across a wireless communication link according to a power on/off command inputted from a user, to receive an audio/video (A/V) signal, to display the A/V signal, and to transmit an acknowledgment signal of the A/V signal. The display system may further include a transmitting device to turn on/off in response to a power control signal received from the receiving device, to transmit the A/V signal to the receiving device, and to control a power thereof according to whether the acknowledgement signal of the A/V signal has arrived.

10 Claims, 8 Drawing Sheets

DISPLAY SYSTEM AND METHOD OF CONTROLLING A DISPLAY SYSTEM

The present application claims priority from Korean Application No. 15882/2006, filed Feb. 17, 2006, the subject matter of which is incorporated herein by reference.

BACKGROUND

1. Field

Embodiments of the present invention may relate to a display system and a method of controlling a display system.

2. Background

A display device may allow a user to watch broadcasting programs by receiving a broadcasting signal and displaying the received broadcasting signal. A digital broadcasting program may be displayed by the display device using a receiving device such as a set-top box. The receiving device may be connected to the display device through a wireless communication link. The receiving device receives a digital broadcasting signal and the received digital broadcasting signal is transmitted to the display device through a wireless data communication link to display the received digital broadcasting signal.

Various wireless data communication schemes have been introduced for the wireless communication between the various electronic devices. Representative wireless data communication technologies include Bluetooth and an infrared connection.

An infrared communication scheme may be easy to embody but it may provide a comparatively-slow data transmission rate and a short communication range. On the other hand, a Bluetooth communication scheme may provide a high data transmission rate and a comparatively-long communication distance. However, Bluetooth communications may be expensive to embody, and Bluetooth communications may be restricted by radio regulations.

BRIEF DESCRIPTION OF THE DRAWINGS

The accompanying drawings are included to provide a further understanding of arrangements and embodiments of the invention and are incorporated in and constitute a part of this application. In the following drawings like reference numerals refer to like elements and wherein.

DETAILED DESCRIPTION

Figure 1:
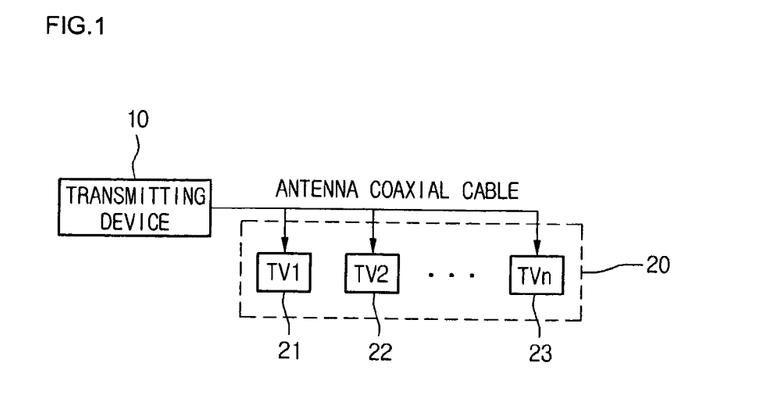
FIG. 1 is a block diagram showing a display system according to one arrangement.

FIG. 1 is a block diagram showing a display system according to one arrangement. Other arrangements are also possible. As shown, the display system includes a transmitting device 10 for receiving a broadcasting signal and transmitting the received broadcasting signal. The display system may further include a plurality of televisions 21, 22, 23 connected to the transmitting device 10 through a cable (shown as antenna coaxial cable).

FIG. 1 shows that the display system includes the transmitting device 10 for receiving a broadcasting signal from a broadcasting station and transmitting the broadcasting signal, and a receiving device 20 having the plurality of televisions 21, 22 and 23 for receiving the broadcasting signal from the transmitting device 10 and displaying the received broadcasting signal.

The transmitting device 10 receives the broadcasting signal configured as a video signal and an audio signal. The transmitting device 10 transmits the received broadcasting signal to the plurality of televisions 21, 22 and 23 through a wired communication link such as a coaxial cable. Each of the televisions 21, 22 and 23 receives the broadcasting signal (configured of the video signal and the audio signal) from the transmitting device 10 and processes the broadcasting signal to display the video signal and to output the audio signal based on the received broadcasting signal.

Such a display system that uses a cable (e.g., a coaxial cable) to connect the transmitting device 10 and the receiving device 20 for communicating to one another may be inconvenient to install. Furthermore, such a cable in an indoor place may be untidy.

Figure 2:
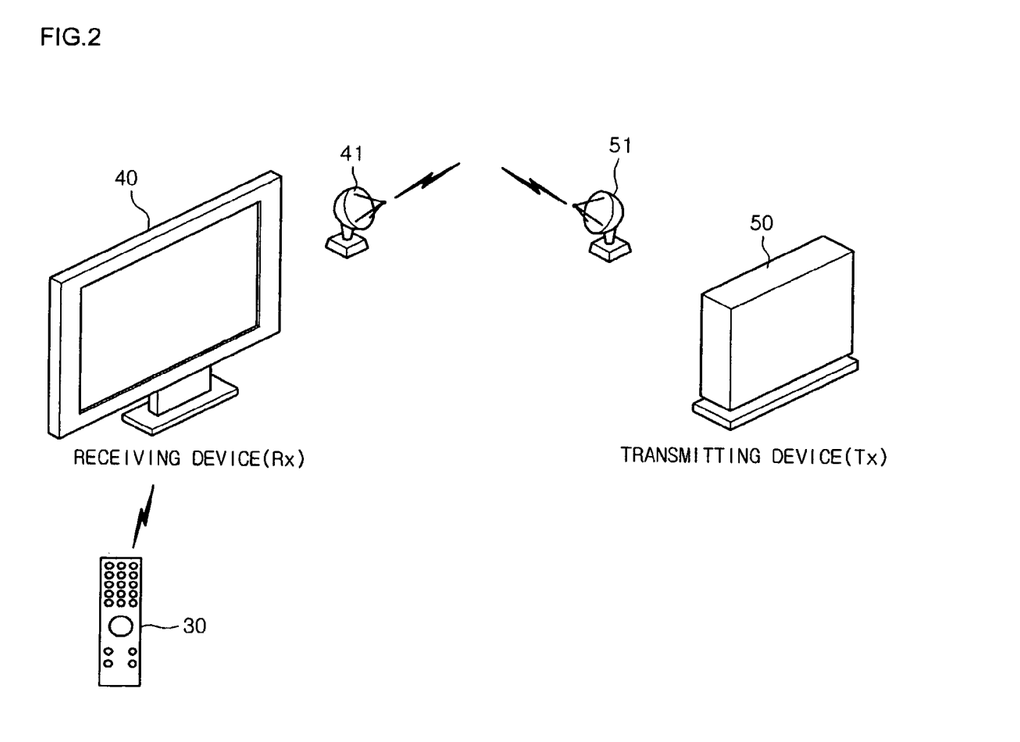
FIG. 2 is a view showing a display system including a receiving device and a transmitting device connected to one another by a wireless link according to one arrangement.

In order to overcome such an inconvenience and/or for other reasons, a display system having a transmitting device and a receiving device connected across a wireless communication link may be provided as shown in FIG. 2.

The display system in FIG. 2 may include a remote controller 30 for transmitting a user request command from a user across a wireless link and a receiving device RX 40 for receiving a signal from the remote controller 30 and to display a broadcasting signal (configured of a video signal and an audio signal). The receiving device RX 40 may include a screen, a display and/or a display device. The display system may further include a transmitting device TX 50 for receiving a broadcasting signal (configured of a video signal and an audio signal) from a broadcasting station and transmitting the received broadcasting signal to the receiving device 40.

The transmitting device TX 50 may control a plurality of receiving devices. The transmitting device TX 50 may receive an analog signal such as a TV signal, a CVBS signal and/or an S-video signal. Although not listed here, other types of signals may also be received. The transmitting device 50 may transform the received signal to a MPEG-2 signal, for example, and transmit the MPEG-2 signal to the receiving device 40 across a wireless communication link. The transmitting device 50 may include a communication module 51 (or transceiver) for communicating with the receiving device 40. The communication module 51 may be integrated with the transmitting device 50 or may be separated from the transmitting device 50.

The receiving device RX 40 may decode the MPEG-2 signal from the transmitting device 50 to display the MPEG-2 signal for a user. The receiving device 40 also transmits a signal inputted from the user (through the remote controller 30) to the transmitting device 50. The receiving device RX 40 may also include a communication module 41 (or transceiver) to communicate with the transmitting device 50. The communication module 41 may be integrated with the receiving device 40 or may be separated from the receiving device 40. The remote controller 30 may control the entire receiving device 40, portions of the receiving device (i.e., a display device) and/or the communication module 41.

As one example, the transmitting device 50 may be installed in a living room of a home, and the receiving device 40 may be installed at different locations of the home such as in a living room, a kitchen, a bathroom and/or a bedroom. The plurality of receiving devices may be installed at several different locations even though the single transmitting device 50 is installed at one location.

The transmitting device 50 may always be on, and the receiving device 40 (or receiving device) may be controlled to be turned on or off in response to a command from the remote controller 30. That is, if the user does not want to watch a broadcasting program, then the user may turn off the receiving device 40 using the remote controller 30. However, the user may not be allowed or capable of turning off the transmitting device 50 using the remote controller 30.

Figure 3:
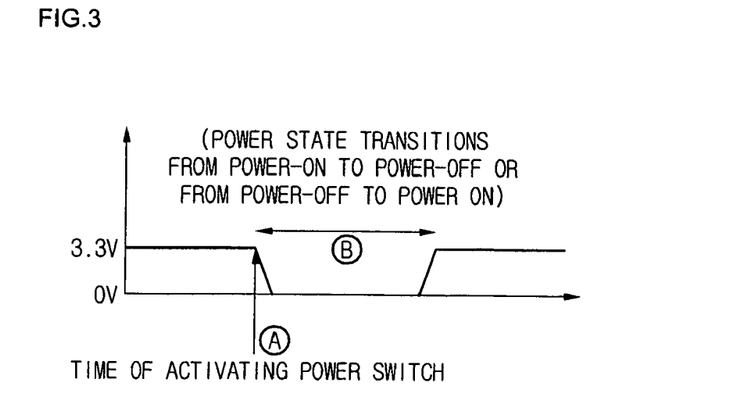
FIG. 3 is a graph for describing a power state transition in a transmitting device.

FIG. 3 is a graph for describing a power state transition in a transmitting device. As shown in FIG. 3, a power state signal of the transmitting device 50 maintains a high level (e.g., 3.3V) before a power switch (not shown) is activated. After activating the power switch, the power state signal transitions from a high state to a low state. When the level of the power state signal is changed, the power state of the transmitting device 50 transitions from on to off, or from off to on.

Figure 4:
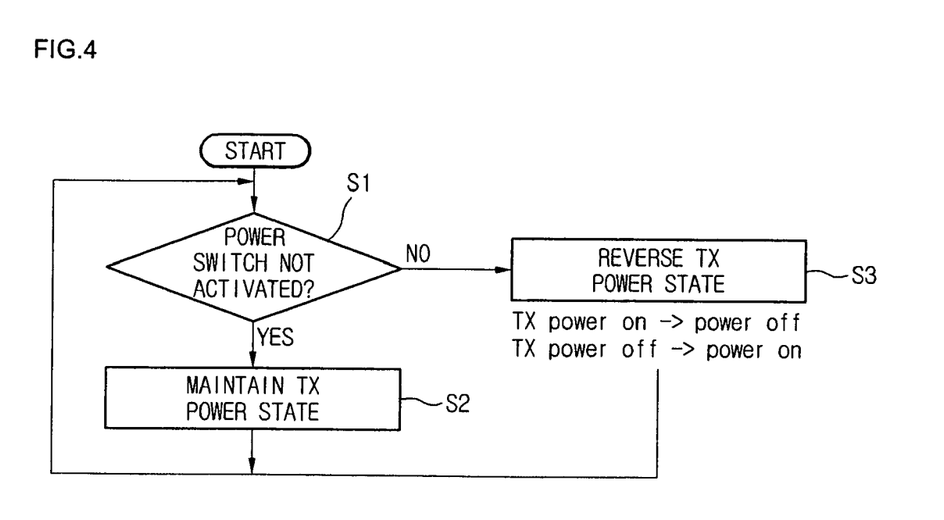
FIG. 4 is a flowchart showing a method of controlling a display system according to one arrangement.

FIG. 4 is a flowchart showing a method of controlling a display system according to one arrangement.

In FIG. 4, a determination is made in operation S1 whether a user activates a power switch or not.

If the user does not activate the power switch in operation S1 (i.e., YES in S1), then a power state is maintained in operation S2 because the power state signal is maintained at the high level.

If the user activates the power switch in operation S1 (i.e., NO in S1), then the power state is reversed in operation S3 because the power state signal transitions from the high level to the low level.

In view of the above, the user may have to physically move to the transmitting device 50 in order to turn off the transmitting device 50, even though the receiving device 40 may be turned off using the remote controller 30.

Figure 5:
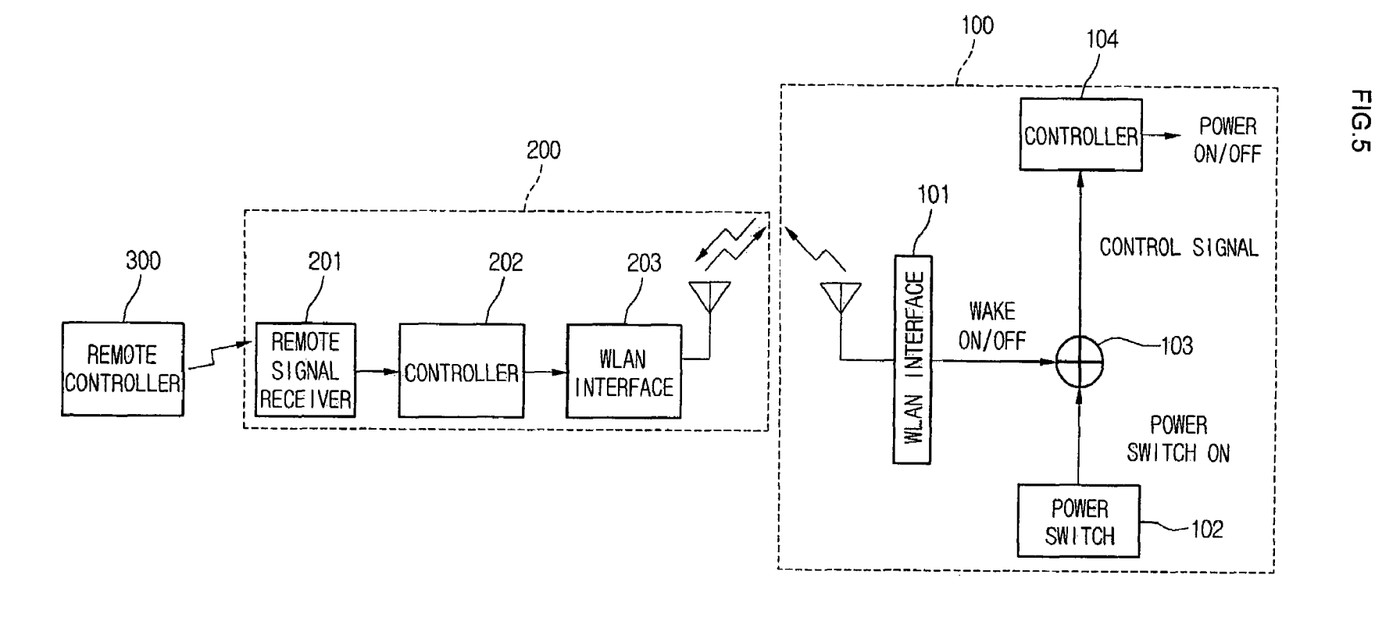
FIG. 5 is a block diagram illustrating a display system according to an example embodiment of the present invention.
Figure 6:
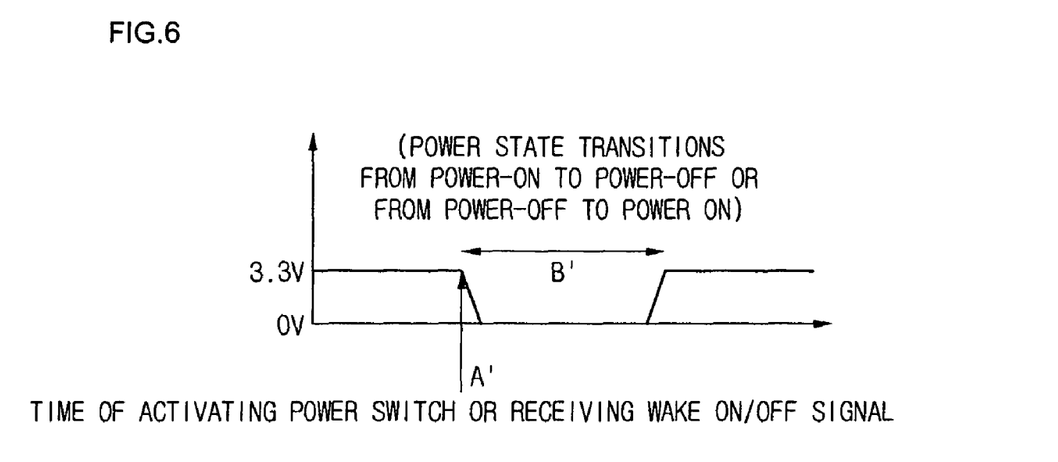
FIG. 6 is a graph showing a power on/off signal waveform according to an example embodiment of the present invention.
Figure 7:
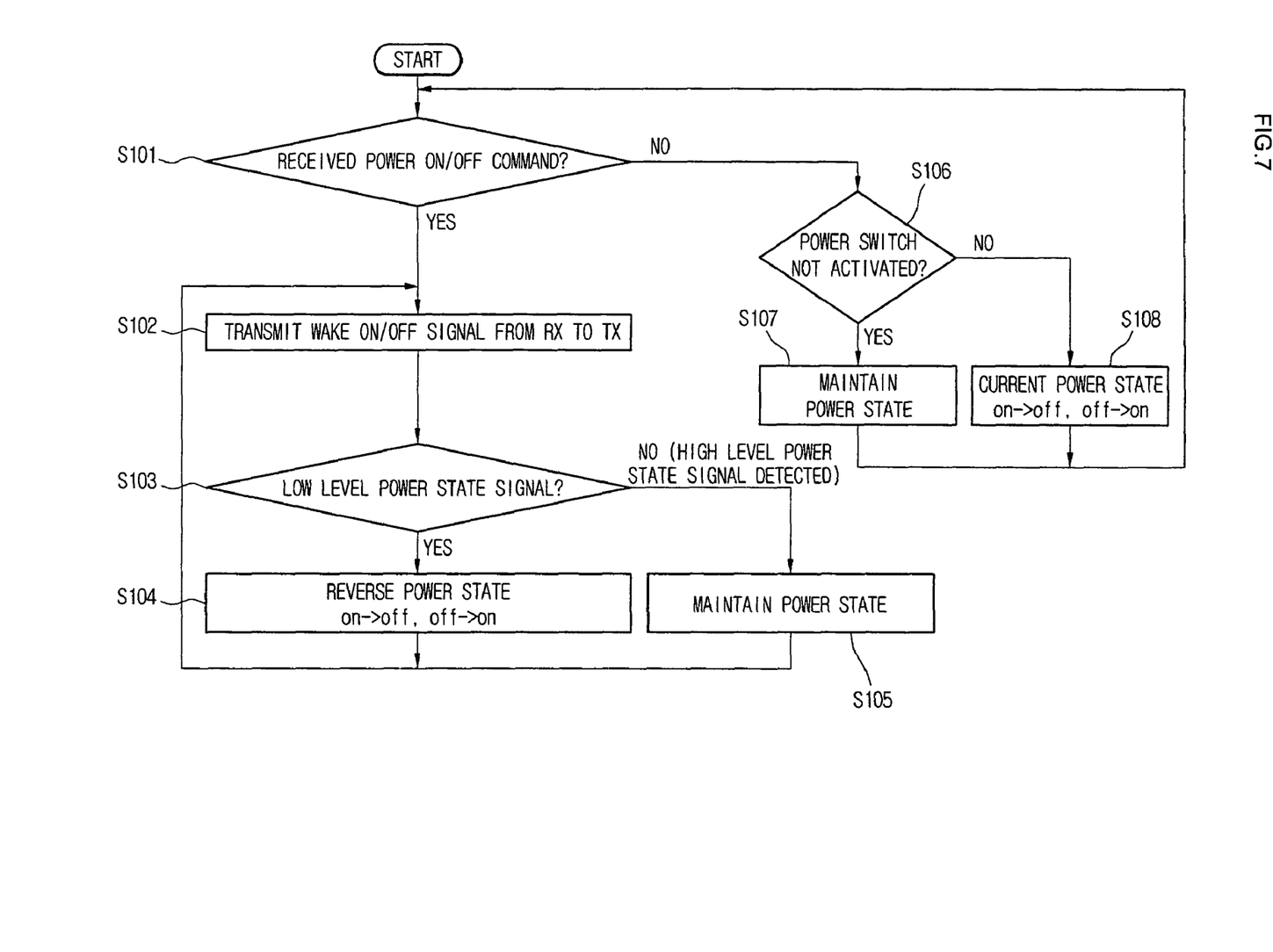
FIG. 7 is a flowchart illustrating a method of controlling a display system according to an example embodiment of the present invention.

FIG. 5 is a block diagram illustrating a display system according to an example embodiment of the present invention. FIG. 6 is a graph showing a power on/off signal waveform according to an example embodiment of the present invention. FIG. 7 is a flowchart showing a method of controlling a display system according to an example embodiment of the present invention. Other configurations and embodiments are also within the scope of the present invention.

FIGS. 5 and 6 show that a display system may include a receiving device 200 for transmitting a power control signal across a wireless communication link according to a power on/off command inputted from a user, and a transmitting device 100 that is turned on/off in response to the power control signal from the receiving device 200 or in response to a switching signal inputted from a user (such as at a power switch). Each of receiving device 200 and the transmitting device 100 may correspond to a separate wireless communication module.

The display system may further include a remote controller 300 for transmitting a user request command to the receiving device 200. The user request command may correspond to a power on/off command to turn power on or off. The user request command may also correspond to other operations such as adjusting power levels, adjusting transmission rates and/or changing channels of communication. For ease of illustration, embodiments may hereafter be described with respect to a power on/off command.

The transmitting device 100 may include a wireless LAN (WLAN) interface 101 for receiving a signal transmitted from the receiving device 200 across a wireless communication link, a power switch 102 for turning power on/off based on a user's input, an adder 103 (or other device) for receiving a signal from the wireless LAN interface 101 or a signal inputted through the power switch 102, and a controller 104 for controlling the power to be turned on or off based on the signal received from the adder 103. For example, the WLAN interface 101 may include a WLAN card. Other types of interfaces or wireless communicating methods may also be used for communicating over the wireless link.

The receiving device 200 may include a remote signal receiver 201 for receiving a user request command (i.e., a power on/off command) inputted through the remote controller 300, a controller 202 for transmitting a power control signal (or other type of signal) to the transmitting device 100 in response to the power on/off command received by the remote signal receiver 201, and a wireless LAN interface 203 for transmitting a signal to the transmitting device 100 across the wireless link in response to the controller 202. For example, the WLAN interface 203 may include a WLAN card. Other types of interfaces or wireless communicating methods may also be used for communicating over the wireless link.

Operation of the display system will now be described in detail.

If a user inputs a power on/off command (or other command) to the receiving device 200 using the remote controller 300, the remote signal receiver 201 receives the power on/off command and transmits the received power on/off command (or other command) to the controller 202. The controller 202 receives the power on/off command from the remote signal receiver 201 and turns on/off the receiving device 200 in response to the received power on/off command. At the same time (or substantially the same time), the controller 202 may transmit a wake on/off signal (or similar type of signal/command) to the transmitting device 100 across the wireless LAN interface 203.

The transmitting device 100 may receive the wake on/off signal transmitted from the receiving device 200 through the wireless LAN interface 101. The adder 103 (or other device) may receive the signal transmitted across the wireless link and a signal of the power switch 102. These signals may be added together at the adder 103, for example. After adding, the adder 103 may then transmit the added result to the controller 104.

The power state signal may transition from a high state level to a low level when the power switch 102 is turned on or the wake on/off signal is received. The power state signal may correspond to the power state of the transmitting device. The controller 104 may detect transitions of the power state signal and change the power state of the transmitting device 100.

As shown in FIG. 6, the transmitting device 100 may maintain a 3.3V high level for the power state signal when the transmitting device is on. If the wake on/off signal is transmitted from the receiving device 200 or the power switch 102 is turned on, then the power state signal may be changed to a low level (i.e., 0V). Accordingly, the controller 104 may change the power state from on to off or from off to on. Other voltage values for the high and low levels are also within the scope of the present invention.

FIG. 7 is a flowchart showing a method of controlling a display system according to an example embodiment of the present invention. Other operations, orders of operations and embodiments are also within the scope of the present invention.

As shown in FIG. 7, a determination is made in operation S101 whether a power on/off command has been received by the receiving device.

If the power on/off command is inputted in operation S101, a signal (e.g., a wake on/off signal) is transmitted from the receiving device to the transmitting device in operation S102.

A determination is made in operation S103 whether a low level power state signal is detected at the transmitting device. If the low level power state signal is detected in operation S103, then a power state may be reversed in operation S104. If a high level power state signal is detected in operation S103, then the power state may be maintained in operation S105.

If the power on/off signal is not detected in the receiving device in operation S101, then a determination may be made in operation S106 whether the power switch of the transmitting device is activated or not.

If the power switch is not activated in operation S106, then the power state (of the transmitting device) is maintained in operation S107. On the other hand, if the power switch is activated in operation S106, then the power state (of the transmitting device) is reversed in operation S108.

A method of controlling the display system according to an embodiment of the present invention may allow the transmitting device to automatically reverse a power state thereof according to a wake on/off signal transmitted across a wireless link when the receiving device receives the power on/off command, such as from a remote controller.

Figure 8:
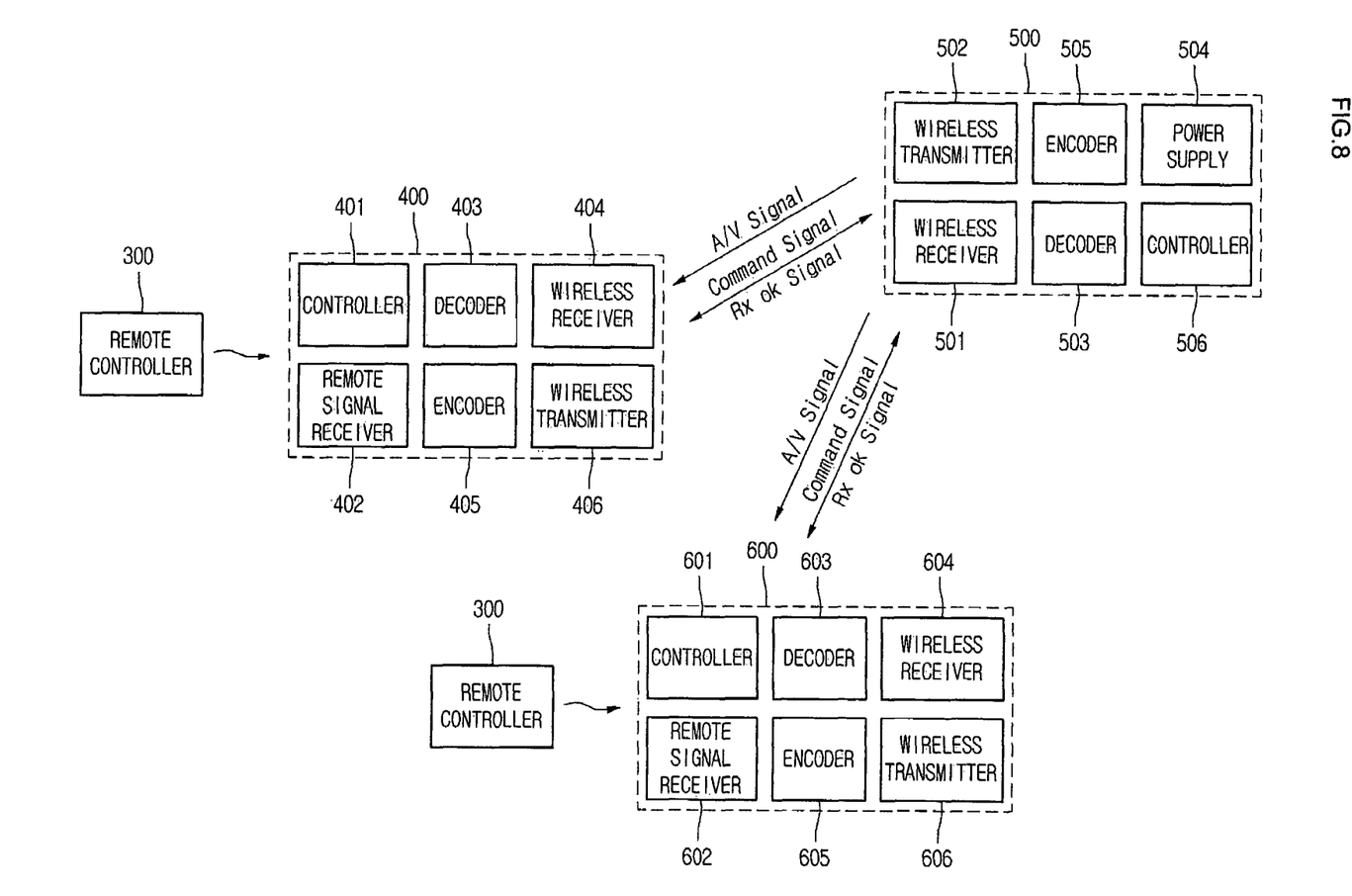
FIGS. 8 to 10 show a display system and a method of controlling a display system according to an example embodiment of the present invention.
Figure 9:
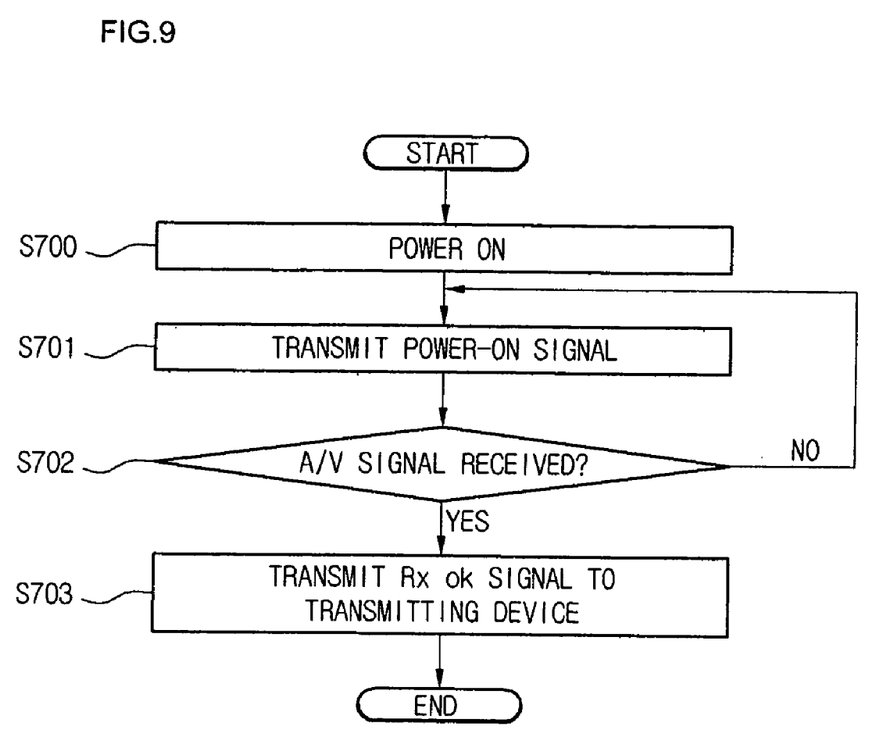
Figure 10:
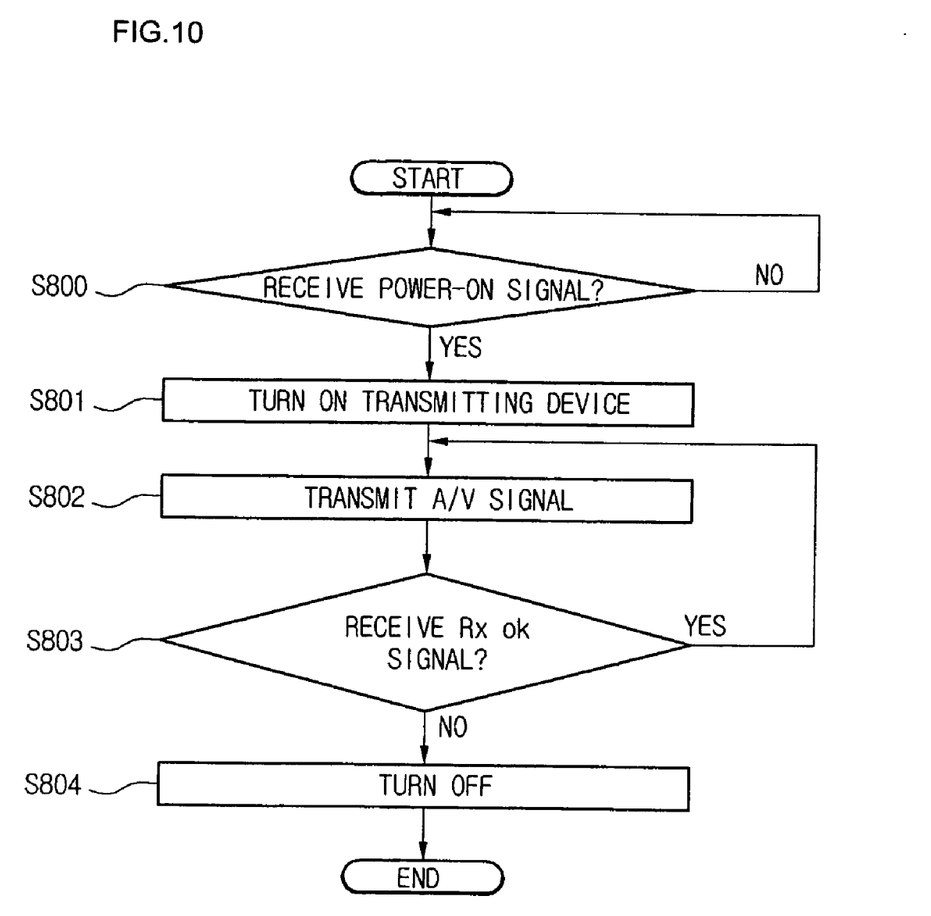

FIGS. 8 through 10 show a display system and a method of controlling a display system according to an example embodiment of the present invention. Other configurations and embodiments are also within the scope of the present invention.

FIGS. 8 through 10 show a display system that includes a receiving device 400 and a transmitting device 500. The receiving device 400 may transmit a power control signal across a wireless communication link in response to a power on/off command (or other command) inputted from a user. The receiving device 400 may also receive and display an audio/video (A/V) signal, and regularly transmitting an acknowledgment signal (Rx ok signal) in response to the A/V signal. The transmitting device 500 may be turned on or off based on the power control signal from the receiving device 400. The transmitting device 500 may also transmit the A/V signal to the receiving device 400 and automatically turn on or off in response to whether the acknowledgment signal (Rx ok signal) is received or not.

The display system may further include a remote controller 300 for transmitting a user request command (or other command) to the receiving device 400. As stated above, the user request command may correspond to a power on/off command or a command for another operation such as adjusting power levels, adjusting transmission rates and/or changing channels of communication. The display system may include additional receiving devices such as a receiving device 600.

The transmitting device 500 may include a wireless receiver 501 for receiving a signal transmitted from the receiving device 400, a decoder 503 for decoding the received signal, a wireless transmitter 502 for transmitting an A/V signal to the receiving device 500 across a wireless communication link, an encoder 505 for encoding the A/V signal, a controller 506 for controlling transmission of the A/V signal and the power, and a power supply 504. In this embodiment, the wireless transmitter 502 and the wireless receiver 501 may correspond to the previously described WLAN interface or other type of interface.

The receiving device 400 may include a remote signal receiver 402 for receiving the user request command (or other command) inputted through the remote controller 300. The receiving device 400 may also include a controller 401 for transmitting a power control signal to the transmitting device 500 based on the command received through the remote signal receiver 402, and the controller 401 may control the receiving device 400 to regularly transmit an acknowledgement signal (Rx ok signal) to the A/V signal when the receiving device 400 receives the A/V signal. The receiving device 400 may further include an encoder 405 for encoding a signal to be transmitted to the transmitting device 500, a wireless transmitter 406 for transmitting the encoded signal, a decoder 403 for decoding a received A/V signal and a wireless receiver 404 for receiving the A/V signal. In this embodiment, the wireless receiver 404 and the wireless transmitter 406 may correspond to the previously described WLAN interface on the other type of interface.

The receiving device 600 may include a remote signal receiver 602 for receiving the user request command (or other command) inputted through the remote controller 300. The receiving device 600 may also include a controller 601 for transmitting a power control signal to the transmitting device 500 based on the command received through the remote signal receiver 602, and the controller 601 may control the receiving device 600 to regularly transmit an acknowledgement signal (Rx ok signal) to the A/V signal in response to the receiving device 600 receiving the A/V signal. The acknowledgment signal may also be sent once, a plurality of times and/or at prescribed intervals. The receiving device 600 may further include an encoder 605 for encoding a signal to be transmitted to the transmitting device 500, a wireless transmitter 606 for transmitting the encoded signal, a decoder 603 for decoding a received A/V signal and a wireless receiver 604 for receiving an A/V signal. In this embodiment, the wireless receiver 604 and the wireless transmitter 606 may correspond to the previously described WLAN interface of other type of interface.

Operations of the display system shown in FIG. 8 will now be described with reference to FIGS. 9 and 10. Operations of the receiving device 400 will first be described.

If a user inputs a power on/off command in operation S700 to the receiving device 400 using the remote controller 300, the remote signal receiver 402 receives the power on/off command from the user and transmits the received power on/off command to the controller 401. The controller 401 may turn on or turn off the receiving device 400 according to the received power on/off command. At the same time (or substantially the same time), the controller 401 may transmit a power on signal to the transmitting device 500 in operation S701.

If an A/V signal from the transmitting device 500 has not yet arrived in operation S702, then the power on signal may be continuously transmitted to the transmitting device 500. The power on signal may also be transmitted at regular or irregular intervals. If the A/V signal from the transmitting device 500 has arrived in operation S702, then an acknowledgement signal (Rx ok signal) may be transmitted (or may be transmitted regularly) to the transmitting device 500 in operation S703 to inform the transmitting device 500 that the A/V signal has been received.

Operations of the transmitting device 500 will now be described with reference to FIG. 10.

If the power on signal is received in operation S800, then the power state of the transmitting device 500 transitions to the on-state in operation S801. The transmitting device 500 may transmit an A/V signal to the receiving device 400 in operation S802.

The transmitting device 500 may check whether an acknowledgement signal (Rx ok signal) from the receiving device 400 is received in operation S803.

If the Rx ok signal has not arrived after a predetermined amount of time (or other amount of time), then the power of the transmitting device 500 may be turned off (or adjusted) in operation S804.

If a plurality of receiving devices receive an A/V signal from a single transmitting device, then the transmitting device may not be turned off (or not adjusted) even though one of the receiving devices is turned off.

The transmitting device may be turned off (or adjusted) when the Rx ok signal has not been received after a predetermined amount time of because all of the receiving devices have been turned off.

The display system and the controlling method thereof may effectively control the power of the transmitting device and the receiving device connected by a wireless communication link. The wireless link may be any of a number of wireless links including a WLAN.

Also, the display system and the controlling method thereof may effectively control the power of the transmitting device and a plurality of the receiving devices connected by a wireless communication link.

Embodiments of the present invention may be directed to a display system and/or a method of controlling a display system that substantially obviates one or more problems due to limitations and disadvantages of disadvantageous arrangements.

Embodiments of the present invention may provide a display system and a method of controlling a display system for effectively controlling a power of the display system that includes a transmitting device and at least one receiving device for receiving a broadcasting signal from the transmitting device and displaying the received broadcasting signal.

Embodiments of the present invention may provide a display system that includes a receiving device and a transmitting device. The receiving device may include a remote signal receiver for receiving a user request command inputted through a remote controller, a controller for transmitting a power control signal according to a power on/off command received through the remote signal receiver, and a wireless communication module for transmitting a corresponding signal in response to the controller and receiving an audio/video (A/V) signal. The transmitting device may include a wireless communication module for receiving a power control signal transmitted through the wireless communication module of the receiving device, a power switch for turning on/off a power in response to an input of the user, an adder for adding the power control signal received through the wireless communication module and a signal inputted through the power switch, and a controller for controlling a power to be on/off by receiving the added signal from the adder.

Embodiments of the present invention may also provide a display system that includes a receiving device and a transmitting device. The receiving device may be for transmitting a power control signal according to a power on/off command inputted from a user through a wireless communication link, receiving an audio/video (A/V) signal, displaying the A/V signal, and regularly transmitting an acknowledgment signal of the A/V signal. The transmitting device may be turned on/off in response to a power control signal transmitted from the receiving device. The transmitting device may further transmit an A/V signal to the receiving device, and control a power thereof according to whether the acknowledgement signal of the A/V signal has arrived or not.

Embodiments of the present invention may also provide a method of controlling a display system that includes transmitting an audio/video (A/V) signal from a first device to a second device, and transmitting an A/V acknowledgement signal regularly to the first device from the second device when the second device receives the A/V signal. The method may further include turning off the power of the first device if the A/V signal has not arrived at the second device for a predetermined time.

Additional advantages, objects, and features of embodiments may become apparent to those having ordinary skill in the art upon examination of the following or may be learned from practice of the invention. Objectives and other advantages may be realized and attained by the structure particularly pointed out in the written description and claims hereof as well as the appended drawings. The foregoing description is exemplary and explanatory and is intended to provide further explanation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A display system comprising:
a receiving device configured to receive an audio/video (A/V) signal transmitted from a transmitting device, and to transmit an acknowledgment signal to the transmitting device when the A/V signal is received; and
the transmitting device configured to transmit the A/V signal to the receiving device, to receive the acknowledgement signal according to the transmitted A/V signal, and to change a power state of the transmitting device when the acknowledgment signal fails to be received at the transmitting device.

2. The display system according to claim 1, further comprising a plurality of additional receiving devices.

3. The display system according to claim 1, wherein the transmitting device includes:
a wireless receiver to receive signals transmitted from the receiving device across a wireless communication link;
a wireless transmitter to transmit the A/V signal to the receiving device; and a controller to control transmission of the A/V signal and to change the power state of the transmitting device based on whether the acknowledgement signal has been received from the receiving device.

4. The display system according to claim 1, wherein the receiving device includes:
   a remote signal receiver to receive a user request command received from a remote controller;
   a controller to transmit the acknowledgement signal of the A/V signal based on arrival of the A/V signal from the transmitting device;
   a wireless transmitter to transmit signals to the transmitting device; and
   a wireless receiver to receive signals transmitted from the transmitting device.

5. The display system according to claim 1, wherein the receiving device comprises a television and the transmitting device transmits broadcasting signals to the television.

6. A method of controlling a display system comprising:
   transmitting an audio/video (A/V) signal from a first device to a second device;
   transmitting an A/V acknowledgement signal from the second device to the first device during prescribed intervals of time when the second device receives the A/V signal transmitted from the first device;
   continually transmitting the A/V signal from the first device to the second device when the acknowledgment signal has been received at the first device; and
   turning off power of the first device when the acknowledgment signal has not been received at the first device during a predetermined period of time.

7. The method according to claim 6, further comprising the first device receiving a broadcasting signal from a broadcasting service provider and transmitting the received broadcasting signal to the second device, and the second device receiving a broadcasting signal from the first device and displaying the received broadcasting signal.

8. The method according to claim 6, further comprising turning off power to the first device when the power to the second device is turned off.

9. A method for controlling a display system, the method comprising:
   transmitting a signal to a receiving device;
   determining whether an acknowledgement signal of the transmitted signal is received from the receiving device;
   changing a power state of a transmitting device when the acknowledgement signal has not been received at the transmitting device; and
   continually transmitting the signal to the receiving device when the acknowledgment signal has been received at the transmitting device.

10. The method according to claim 9, wherein the transmitted signal comprises an audio or video signal.

* * * * *